(12) United States Patent
Harada et al.

(10) Patent No.: US 7,616,658 B2
(45) Date of Patent: Nov. 10, 2009

(54) ADAPTIVE WIRELESS PARAMETER CONTROL METHOD, QOS CONTROL DEVICE AND WIRELESS COMMUNICATION SYSTEM

(75) Inventors: Atsushi Harada, Kawasaki (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 898 days.

(21) Appl. No.: 10/373,747

(22) Filed: Feb. 27, 2003

(65) Prior Publication Data

US 2003/0161323 A1  Aug. 28, 2003

(30) Foreign Application Priority Data

Feb. 28, 2002 (JP) ............................. 2002-053567

(51) Int. Cl.
  *H04J 3/16* (2006.01)
  *H03M 13/00* (2006.01)
  *H04W 72/00* (2009.01)
(52) U.S. Cl. ...................... 370/465; 714/751; 714/774; 455/452.2
(58) Field of Classification Search .................. None
  See application file for complete search history.

(56) References Cited

U.S. PATENT DOCUMENTS

| | | | | |
|---|---|---|---|---|
| 5,487,072 | A * | 1/1996 | Kant ........................... | 714/748 |
| 6,005,851 | A * | 12/1999 | Craddock et al. ............ | 370/329 |
| 6,349,138 | B1 * | 2/2002 | Doshi et al. .................. | 380/200 |
| 6,445,916 | B1 * | 9/2002 | Rahman ...................... | 455/423 |
| 6,571,366 | B1 * | 5/2003 | Doetsch et al. ............. | 714/751 |
| 6,587,457 | B1 * | 7/2003 | Mikkonen .................... | 370/356 |
| 6,594,268 | B1 * | 7/2003 | Aukia et al. ................. | 370/400 |
| 6,604,216 | B1 * | 8/2003 | Javerbring et al. .......... | 714/751 |
| 6,606,311 | B1 * | 8/2003 | Wang et al. .................. | 370/338 |
| 6,704,898 | B1 * | 3/2004 | Furuskar et al. ............. | 714/751 |

(Continued)

FOREIGN PATENT DOCUMENTS

CN     1269084      10/2000

(Continued)

OTHER PUBLICATIONS

A. Kadelka, et al., Computer Networks, Elsevier Science B. V., vol. 37, No. 1, XP-004304930, pp. 17-24, "Serving IP Quality of Service With Hiperlan/2", Sep. 2001.

(Continued)

*Primary Examiner*—Gregory B Sefcheck
(74) *Attorney, Agent, or Firm*—Oblon, Spivak, McClelland, Maier & Neustadt, L.L.P.

(57) ABSTRACT

A QoS information identification unit receives a packet to be transmitted and based on QoS information, identifies the QoS type of the packet, and outputs the obtained QoS type to an adaptive wireless parameter controller as requested QoS information. The adaptive wireless parameter controller adaptively defines a retransmission parameter, an encoding scheme and a modulation scheme, based on the requested QoS information received from the QoS information identification unit, observed QoS information at the receiving side notified from the receiving side, and transmission path information. A transmission sequencing controller performs retransmission control for the packet based on the retransmission parameter defined therebefore. A data encoder encodes the packet based on the encoding scheme defined therebefore. A data modulator modulates the packet based on the modulation scheme defined therebefore.

5 Claims, 5 Drawing Sheets

U.S. PATENT DOCUMENTS

| | | | |
|---|---|---|---|
| 6,711,180 B1* | 3/2004 | Delesalle et al. | 370/474 |
| 6,822,940 B1* | 11/2004 | Zavalkovsky et al. | 370/237 |
| 6,901,046 B2* | 5/2005 | Hsu et al. | 370/204 |
| 6,999,432 B2* | 2/2006 | Zhang et al. | 370/328 |
| 7,006,435 B1* | 2/2006 | Davies et al. | 370/230 |
| 7,047,456 B2* | 5/2006 | Jutzi | 714/712 |
| 7,072,336 B2* | 7/2006 | Barany et al. | 370/389 |
| 7,126,917 B2* | 10/2006 | Harris et al. | 370/235 |
| 7,150,017 B1* | 12/2006 | Vogl et al. | 718/102 |
| 7,180,871 B1* | 2/2007 | Khaflzov et al. | 370/252 |
| 7,185,257 B2* | 2/2007 | Kim et al. | 714/751 |
| 7,447,287 B1* | 11/2008 | Parantainen | 375/354 |
| 2002/0051424 A1* | 5/2002 | Krishnamoorthy et al. | 370/204 |
| 2002/0119783 A1* | 8/2002 | Bourlas et al. | 455/453 |
| 2003/0035396 A1* | 2/2003 | Haartsen et al. | 370/336 |
| 2003/0046633 A1* | 3/2003 | Jutzi | 714/774 |
| 2003/0126536 A1* | 7/2003 | Gollamudi et al. | 714/748 |
| 2004/0165596 A1* | 8/2004 | Garcia et al. | 370/395.21 |
| 2005/0094667 A1* | 5/2005 | Dahlman et al. | 370/473 |
| 2006/0078000 A1* | 4/2006 | Rinne et al. | 370/469 |
| 2006/0146863 A1* | 7/2006 | Spinar et al. | 370/449 |
| 2008/0282127 A1* | 11/2008 | Mantha et al. | 714/751 |

FOREIGN PATENT DOCUMENTS

| | | |
|---|---|---|
| CN | 1291016 | 4/2001 |
| EP | 0 973 302 | 1/2000 |
| JP | 07-131358 | 5/1995 |
| JP | 09-116486 | 5/1997 |
| JP | 2000-324321 | 11/2000 |
| JP | 2001-309426 | 11/2001 |
| JP | 2001-320346 | 11/2001 |
| WO | WO 99/48310 | 9/1999 |
| WO | WO 00/04728 | 1/2000 |
| WO | WO 00/41426 | 7/2000 |
| WO | WO 00/78081 | 12/2000 |
| WO | WO 01/86826 | 11/2001 |

OTHER PUBLICATIONS

Z. Dongm EI, et al., pp. 35-37, "The Protocols of Wireless Asynchronous Transfer Mode (WATM)", Jan. 1998 (with English Abstract).

* cited by examiner

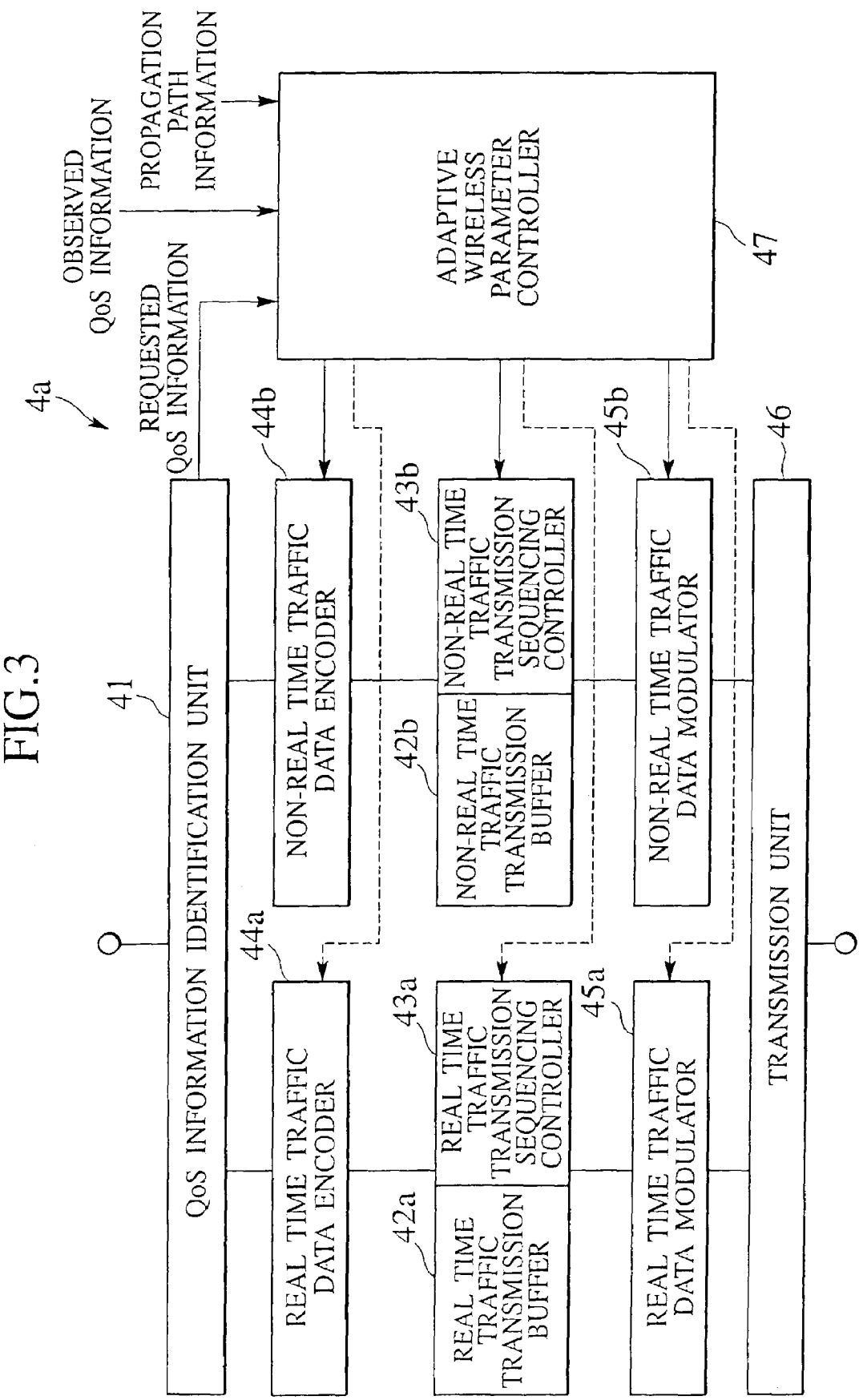

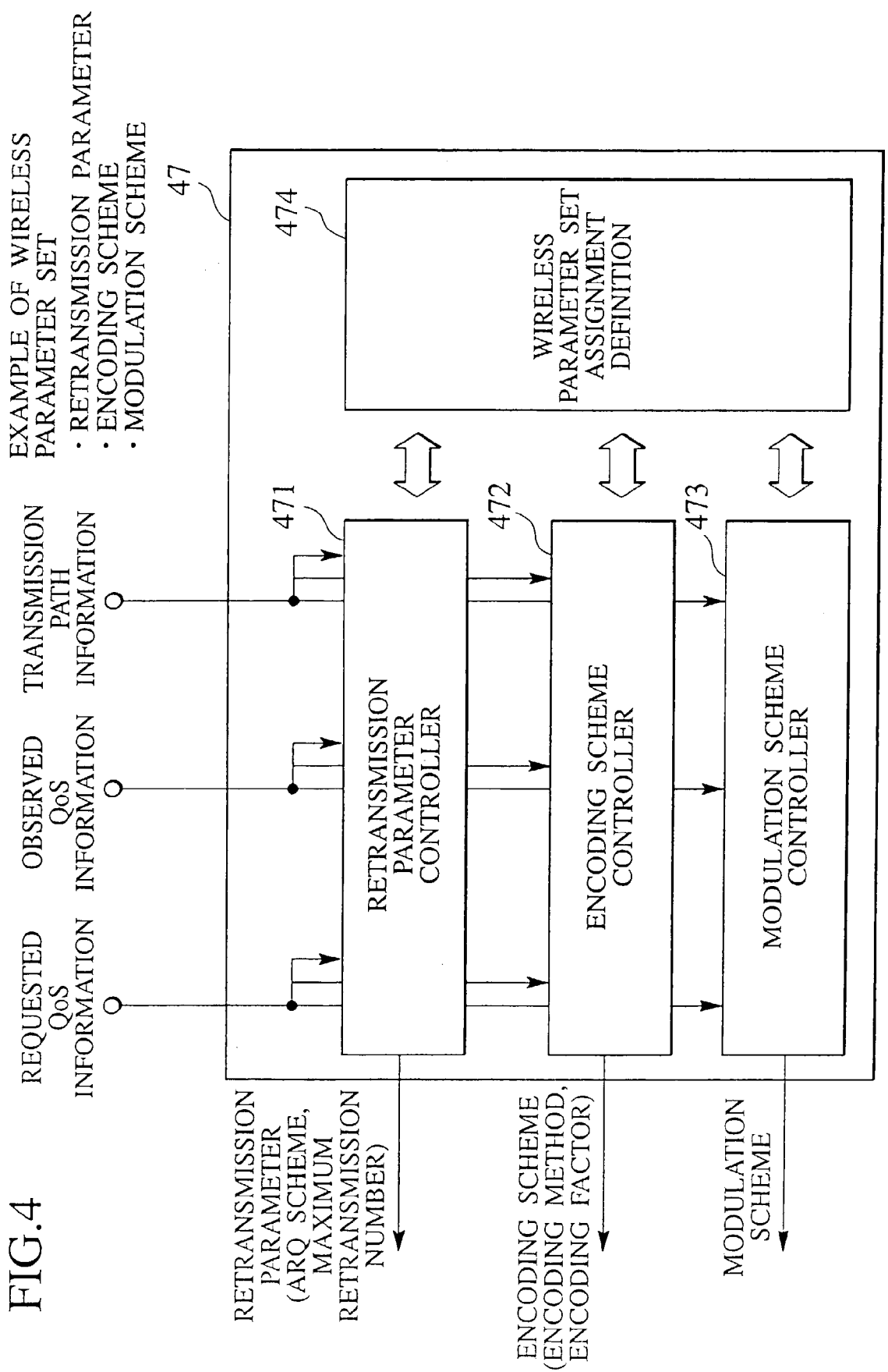

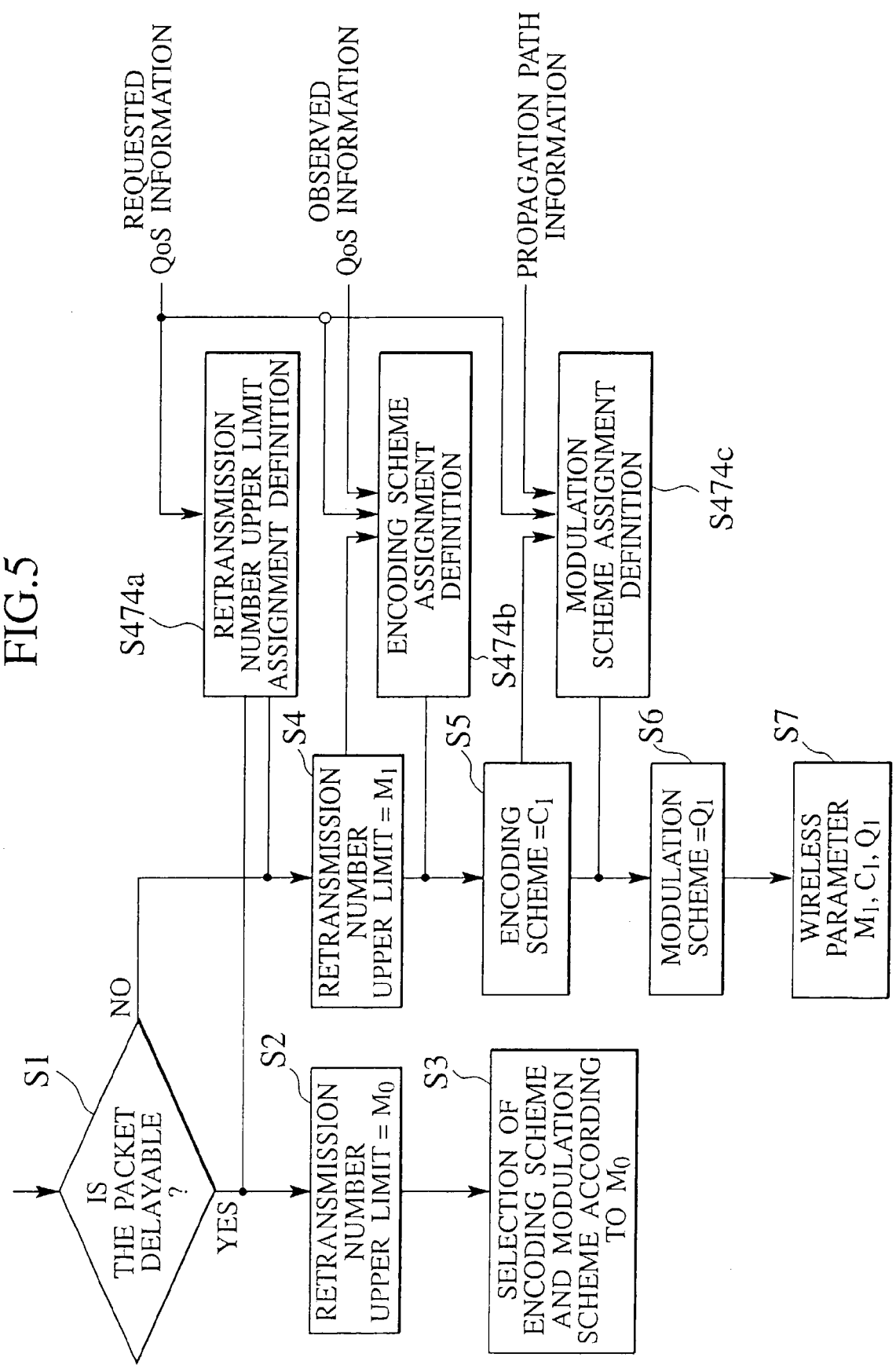

ADAPTIVE WIRELESS PARAMETER CONTROL METHOD, QOS CONTROL DEVICE AND WIRELESS COMMUNICATION SYSTEM

CROSS REFERENCE TO RELATED APPLICATION

This application claims benefit of priority under 35 U.S.C. § 119 to Japanese Patent Application No. 2002-53567, filed on Feb. 28, 2002, the entire contents of which are incorporated by reference herein.

BACKGROUND OF THE INVENTION

1. Field of the Invention

The present invention relates to an adaptive wireless parameter control method, a QoS control device and a wireless communication system, and more particularly to an adaptive wireless parameter control method, a QoS control device and a wireless communication system, which fix wireless parameters adaptably, depending on quality of service required for packets to be transmitted, in transmitting the packets wirelessly.

2. Descriptions of the Related Arts

In next generation mobile communication systems (International Mobile Telecommunication-2000: IMT-2000), requirements for the maximum information transmission speed in accordance with "mobile environment", "walking environment" and "quasi-stationary environment" are 144 kbps, 384 kbps and 2 Mbps, respectively, and genuine multimedia mobile communication can be realized in addition to voice service. However, when considering rapid spread of Internet, diversification and high capacity of information in recent years as well as progress of next generation Internet, development of a wireless access scheme for realizing an information transmission speed exceeding 2 Mbps in mobile communication is urgent.

Under such background, a scheme for realizing a high-speed packet transmission with the maximum information transmission speed of 2.4 Mbps based on IS-95 wireless interface is proposed in the literature (CDMA/HDR: A Bandwidth-Efficient High-Speed Wireless Data Services for Nomadic Users (P. bender, P. Black, M. Grob, R. Padovani, N. Sindhushayana, and A. Viterbi: IEEE Communication Magazine vol. 38, no. 7, pp 70-77, July 2000)). Furthermore, also in 3GPP (3rd Generation Partnership Project), the investigation for realizing a high-speed packet transmission with the maximum information transmission speed of about 8.5 Mbps, which expands W-CDMA wireless interface, has been performed.

In the high-speed packet transmission as described above, have been investigated applications of technologies including adaptive modulation/demodulation and error correction (channel encoding) based on an adaptive wireless link control (link adaptation) proposed in the literature (Symbol Rate and Modulation Level-Controlled Adaptive Modulation/TDMA/TDD System for High-Bit-Rate Wireless Data Transmission (T. Ue, S. Sampei, and N. Morinaga: IEEE Transaction. VT, pp 1134-1147, vol. 47, no. 4, November 1998)) and an automatic repeat request (ARQ) proposed in the literature (Automatic-Repeat-Request Error Control Schemes (S. Lin, D. Costello, Jr., and M. Miller: IEEE Communication Magazine, vol. 12, no. 12, pp 5-17, December 1984)).

The adaptive modulation/demodulation and error correction based on the link adaptation means a scheme for switching a data modulation multi-value, a spreading factor (SF), the number of multi-codes, and an encoding factor of the error correction to others depending on propagation environments for users, in order to effectively perform a high-speed data transmission. Herein, for example, as to the data modulation, the maximum throughput of the system can be increased by sequentially switching from the QPSK modulation, which is adopted in the present W-CDMA, to more efficient multi-value modulations, that is, 8 PSK, 16 QAM and 64 QAM, according to improvement of the propagation environments. To be concrete, when assuming that SF be equal to 4, the number of multi-codes be equal to 3 and a forward error correction factor be equal to ½, it is possible to perform ultra high-speed data transmission of 8.5 Mbps by use of W-CDMA wireless interface showing a chip rate of 3.84 Mcps when 64 QAM is used as a data modulation scheme.

Incidentally, in such broadband wireless access, diversification in requirements for quality of service (QoS) such as a transmission speed, a transmission delay and a residual BER (Bit Error Ratio) is predicted.

For example, in traffic such as voice and video for which real time transmission is required, increases in a transmission delay and in delay fluctuation cause significant deterioration of quality. Accordingly, bit error concerning the packets is permitted within a range satisfying communication quality without dumping of the packet that includes the error so that a transmission delay time from a transmission end to a receiving end must be constrained to a range of the requirements in accordance with the quality of services (QoS).

On the other hand, in non-real time traffic such as file transfer and WWW (World Wide Web) browsing, though a demand for the transmission delay is weaker compared to the real time traffic, transmission with high throughput and reliability, which is basically free from error, is required.

Although an automatic repeat request (ARQ) in the packet transmission scheme is an effective technology for high reliability transmission, it causes transmission delay and delay fluctuation in the real time traffic.

Furthermore, while receiving quality is improved by performing channel encoding with high error correction capability, throughput is decreased due to a decrease in frame efficiency.

Accordingly, in order to provide multimedia services effectively in such a packet transmission scheme including a mix of various types of traffic, effective applications of an error control (QoS control) technology between wireless sections are more important. Specifically, when the error control (QoS control) by a technology such as an error protection using an automatic repeat request between a wireless sections and a forward error correction (FEC) is performed, different standards for respective kinds of traffics must be applied.

However, in conventional link adaptation technology, wireless parameters including the optimum modulation scheme and the forward error correction method which are adapted only to a wireless link state (conditions of propagation path) have been merely selected, and QoS based on requests concerning traffic characteristics, in particular delay, has not been considered.

From the above described viewpoints, it has been proved to be very useful to select wireless parameters including the modulation scheme, the forward error correction scheme, and the upper limit of repeat times of the automatic repeat request while taking into consideration the trade off between advantages and disadvantages in the error modulation scheme adaptively switched in response to the QoS requirements. Moreover, it is inferred that combinations of respective adoptive selections vary in accordance with the QoS requirements.

SUMMARY OF THE INVENTION

The present invention arises from the above circumstances with an object of the present invention being to provide an adaptive wireless parameter control method, a QoS control device and a wireless communication system, which assign different wireless parameter adaptively for each different type of traffic according to requested QoS in packet transmission, taking into consideration that requested QoS differs according to the type of traffic.

In order to achieve the above object, there is provided an adaptive wireless parameter control method, in which a wireless parameter set corresponding to communication quality QoS is assigned for each packet to be transmitted different in a communication quality QoS request in mobile packet communication.

In a preferred embodiment of the present invention, the wireless parameter set includes at least any one of a retransmission parameter, a forward error correction scheme and a modulation scheme.

In a preferred embodiment of the present invention, the retransmission parameter is adjustably assigned in accordance with the communication quality QoS.

In a preferred embodiment of the present invention, the retransmission parameter includes at least any one of a retransmission algorithm and a maximum retransmission number of times.

In a preferred embodiment of the present invention, the maximum retransmission number of times is adjustably assigned based on whether the packet to be transmitted is a delayable packet.

In a preferred embodiment of the present invention, the forward error correction scheme is adjustably assigned in accordance with the communication quality QoS.

In a preferred embodiment of the present invention, the forward error correction scheme includes at least any one of an encoding method and an encoding factor.

In a preferred embodiment of the present invention, the modulation scheme is adjustably assigned in accordance with the communication quality QoS.

In a preferred embodiment of the present invention, the communication quality QoS includes communication quality QoS requested for the packet to be transmitted and communication quality QoS observed in an actual transmission.

In a preferred embodiment of the present invention, information concerning the communication quality QoS requested for the packet to be transmitted is superimposed within the packet.

In a preferred embodiment of the present invention, in the case that the communication quality QoS requested for the packet to be transmitted is common to a plurality of packets, the information concerning the communication quality QoS is added to the plurality of packets.

In a preferred embodiment of the present invention, the wireless parameter set is assigned in accordance with the communication quality QoS and transmission path information.

Also in order to achieve to the object above, there is provided a QoS control device, including an adaptive wireless parameter controller for assigning a wireless parameter set corresponding to communication quality QoS for each packet to be transmitted different in the communication quality QoS in mobile packet communication.

In a preferred embodiment of the present invention, the adaptive wireless parameter controller has a retransmission parameter controller which adjustably assigns a retransmission parameter as one of the wireless parameter set in accordance with the communication quality QoS.

In a preferred embodiment of the present invention, the adaptive wireless parameter controller has an encoding scheme controller which adjustably assigns a forward error correction scheme as one of the wireless parameter set in accordance with the communication quality QoS.

In a preferred embodiment of the present invention, the adaptive wireless parameter controller has a modulation scheme controller which adjustably assigns a modulation scheme as one of the wireless parameter set in accordance with the communication quality QoS.

In a preferred embodiment of the present invention, the QoS control device further includes a transmission sequencing controller for inputting the retransmission parameter set by the retransmission parameter controller, and for performing retransmission control with respect to the packet to be transmitted based upon the retransmission parameter.

In a preferred embodiment of the present invention, the QoS control device further includes an encoder for inputting the forward error correction scheme set by the encoding scheme controller, and for performing encoding with respect to the packet to be transmitted based upon the forward error correction scheme.

In a preferred embodiment of the present invention, the QoS control device further includes a modulator for inputting the modulation scheme set by the modulation scheme controller, and for performing modulation processing with respect to the packet to be transmitted based upon the modulation scheme.

In a preferred embodiment of the present invention, the QoS control device further includes a QoS information identification unit for inputting the packet to be transmitted, for identifying the communication quality QoS requested by the packet, and for supplying the identified communication quality QoS to the adaptive wireless parameter controller.

Also in order to achieve the above object, there is provided a wireless communication system, including a base station, and a mobile terminal for performing wireless communication with the base station. Moreover, the base station includes an adaptive wireless parameter controller for assigning a wireless parameter set corresponding to communication quality QoS for each packet to be transmitted different in the communication quality QoS, when packet communication is performed with the mobile terminal.

In a preferred embodiment of the present invention, the base station regularly receives from the mobile terminal, the communication quality QoS observed in the actual transmission with the mobile terminal.

In a preferred embodiment of the present invention, the base station receives from the mobile terminal, the communication quality QoS observed in the actual transmission with the mobile terminal, by requesting to the mobile terminal.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a diagram showing a configuration of a QoS control device of another embodiment according to the present invention;

FIG. 4 is a diagram showing a detailed configuration of an adaptive wireless parameter controller in the QoS control device; and FIG. 5 is a flowchart for explaining processing in the adaptive wireless parameter control method of one embodiment according to the present invention.

DESCRIPTION OF THE PREFERRED EMBODIMENTS

Hereinafter, with reference to drawings, detailed description will be made of the adaptive wireless parameter control method, the QoS control device and the wireless communication system of embodiments according to the present invention.

Figure 1:
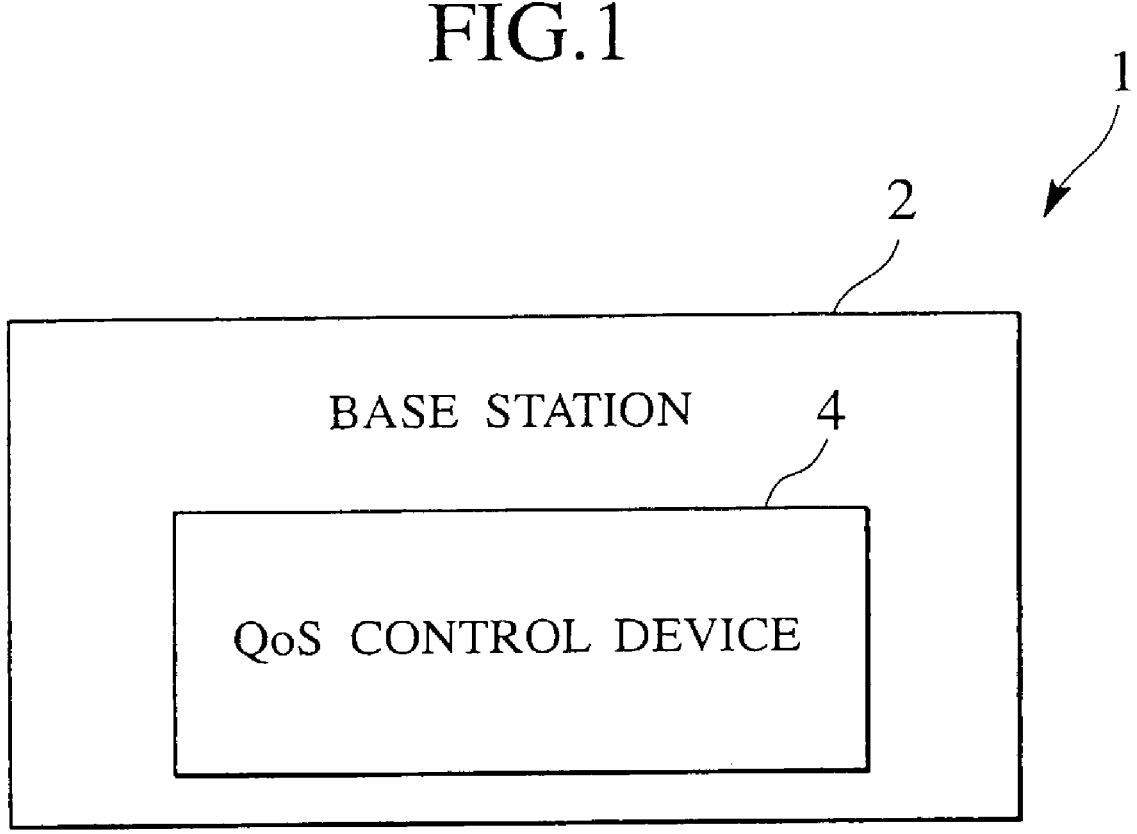
FIG. 1 is a diagram showing a configuration of a wireless communication system of one embodiment according to the present invention.
Figure 1:
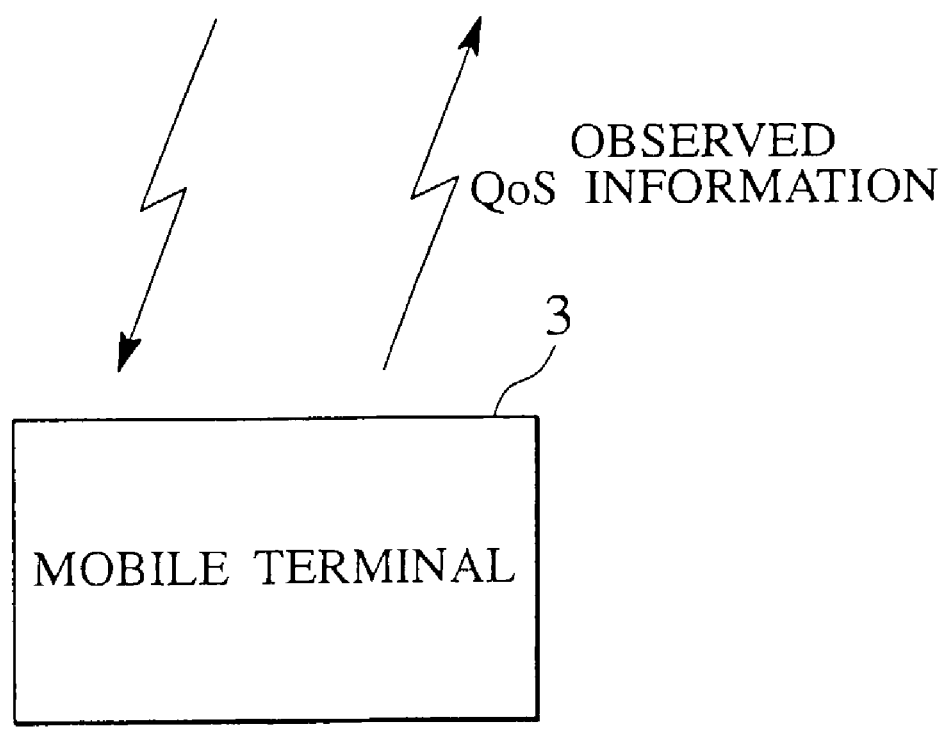

FIG. 1 is a diagram showing the configuration of the wireless communication system of one embodiment according to the present invention. According to the same diagram, the wireless communication system 1 is composed of a base station 2 and a mobile terminal 3 which performs wireless communication with the base station 2. Furthermore, the base station 2 incorporates a QoS control device 4.

Figure 2:
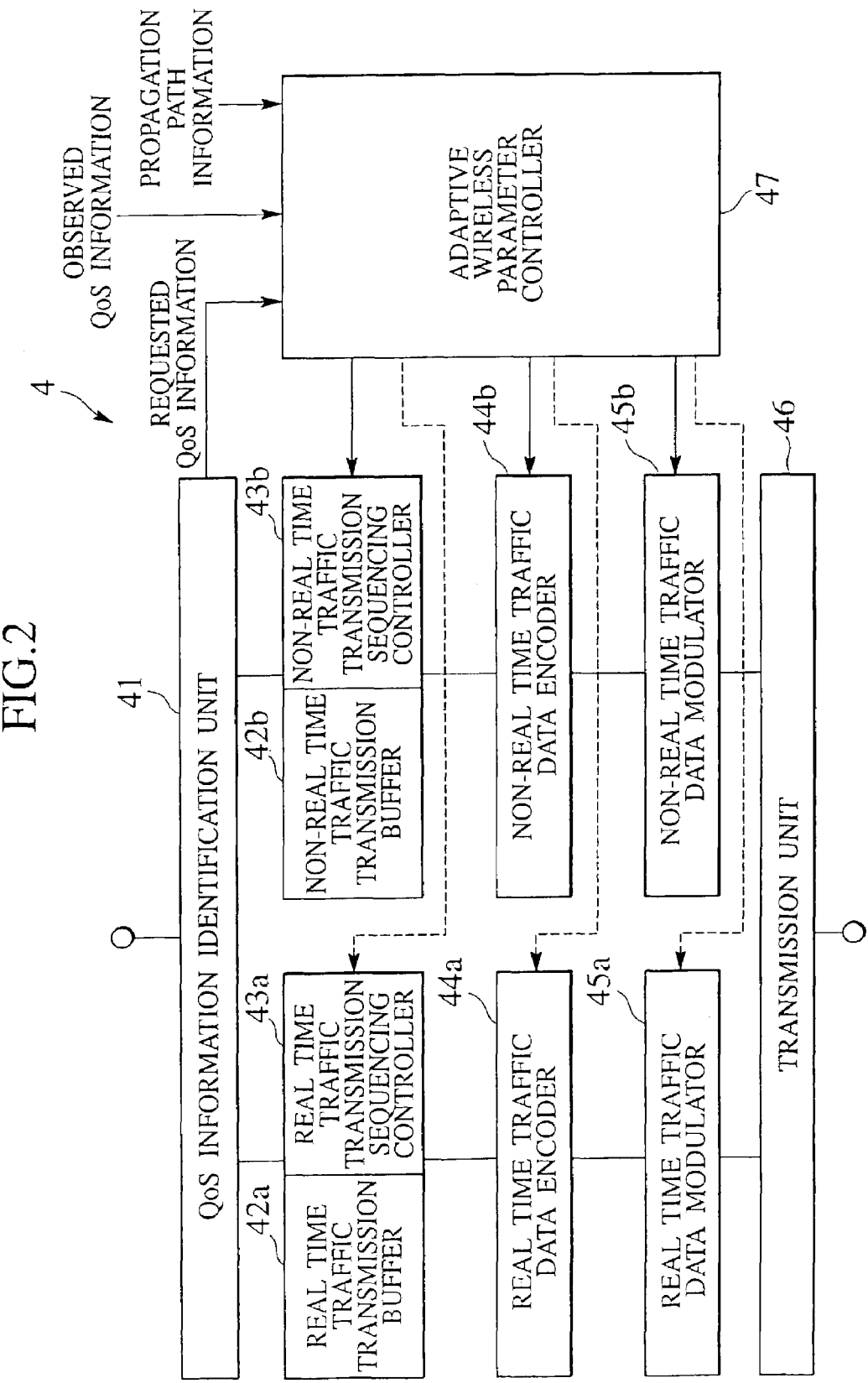
FIG. 2 is a diagram showing a configuration of a QoS control device of one embodiment according to the present invention.

FIG. 2 is a diagram showing the configuration of the QoS control device of one embodiment according to the present invention. According to the same diagram, the QoS control device 4 is composed of a QoS information identification unit 41, a transmission buffer 42, a transmission sequencing controller 43, a data encoder 44, a data modulator 45, a transmission unit 46 and an adaptive wireless parameter controller 47. Note that each of the transmission buffer 42, the transmission sequencing controller 43, the data encoder 44 and the data modulator 45 is constituted respectively by a pair of a real time traffic transmission buffer 42a and a non-real time traffic transmission buffer 42b, a pair of a real time traffic transmission sequencing controller 43a and a non-real time traffic transmission sequencing controller 43b, a pair of a real time traffic data encoder 44a and an on-real time traffic data encoder 44b, and a pair of a real time traffic modulator 45a and a non-real time traffic data modulator 45b.

Next, description will be made of the operation of the QoS control device shown in the diagram.

The QoS information identification unit 41 receives a packet that is to be transmitted and based on QoS information such as an allowable transmission delay and a required transmission rate, identifies the QoS type of the packet, and outputs the obtained QoS type to the adaptive wireless parameter controller 47 as requested QoS information. The aforementioned QoS information heretofore includes information such as allowable transmission delay and required transmission rates. Note, here, other than the allowable transmission delay and required transmission rates that the QoS information also includes an allowable error ratio, data disposability, the priority and importance of a packet to be transmitted, and the like. In the case that the QoS information differs for each packet, this QoS information is superimposed in an individual packet to be transmitted, and also, when the QoS information is common to a plurality of packets, the QoS information may be added to the plurality of packets. It does not matter whether common QoS information is superimposed in individual packets in a case where the QoS information is common to a plurality of packets.

The adaptive wireless parameter controller 47 adaptively defines wireless parameters based on requested QoS information received from the QoS information identification unit 41, observed QoS information for the receiving side notified by the receiving side (mobile terminal 3 in the present embodiment) and transmission path information. According to the present invention, a wireless parameter set includes a retransmission parameter, an encoding scheme and a modulation scheme. Moreover, to be more specific, as the retransmission parameter, there are an ARQ scheme and a maximum retransmission number. As the encoding scheme, there are the forward error correction method and the encoding factor.

Also, as the transmission path information, an instant receiving quality and a delay profile and the like predicted for the transmission timing of the mobile terminal 3 is conceivable from instant receiving quality, average receiving quality and variation in past receiving quality. Furthermore, here, the receiving quality includes all characteristics that can be expressed in numbers, such as, Signal-to-Interference Ratio (SIR), Carrier-to-Interference Ratio (CIR) and Received Signal Code Power (RSCP).

The adaptive wireless parameter controller 47 according to the present invention makes a rough determination as to whether transmission traffic to be transmitted is real time traffic or non-real time traffic when defining the wireless parameter set. In the case that the traffic is real time traffic the defined parameter set is sent to the real time traffic transmission sequencing controller 43a, the real time traffic data encoder 44a and the real time traffic data modulator 45a. On the other hand in the case that the traffic is non-real time traffic, the defined parameter set is sent to the non-real time traffic transmission sequencing controller 43b, the non-real time traffic data encoder 44b and the non-real time traffic data modulator 45b.

In the case of real time traffic, real time traffic transmission sequencing controller 43a stores the packet to be transmitted in the real time traffic transmission buffer 42a, and at the same time based on the retransmission parameter that is sent from the adaptive wireless parameter controller 47, performs the retransmission control. Real time traffic data encoder 44a encodes the packet to be transmitted based on the encoding scheme sent from the adaptive wireless parameter controller 47. The real time traffic modulator 45a modulates the packet to be transmitted based on the modulation scheme sent from the adaptive wireless parameter controller 47. On the other hand, in the case of non-real time traffic, the non-real time traffic transmission sequencing controller 43b stores the packet to be transmitted in the non-real time traffic transmission buffer 42b, and at the same time based on the retransmission parameter that is sent from the adaptive wireless parameter controller 47, performs the retransmission control. Non-real time traffic data encoder 44b encodes the packet to be transmitted based on the encoding scheme sent from the adaptive wireless parameter controller 47. The non-real time traffic data modulator 45b modulates the packet to be transmitted based on the modulation scheme sent from the adaptive wireless parameter controller 47.

The packet to be transmitted is transmitted through the transmission unit 46 after having retransmission controlled, encoded and modulated. Moreover, the wireless parameter itself defined at the adaptive wireless parameter controller 47 is notified of the receiving side, that is, the mobile terminal 3.

Note that, heretofore, the transmission buffer 42, the transmission sequencing controller 43, the data encoder 44 and the data modulator 45 were described as each being in a real time traffic and non-real time traffic pair, however, it is needless to say that there is no physical requirement for the division, and that it is also logically conceivable for the adaptive wireless parameter controller 47 to utilize determination criteria other than that in which the determination is made in the two divided cases. However, as will be illustrated with reference to FIG. 5, the reason why configuration of the QoS control device 4 was explained in this divided state was because it is generally preferable to make to one of the large determination criteria, one which firstly determines whether the packet to be transmitted is a packet which is delayable or not.

In following the above embodiment, since each type of wireless parameter is defined adaptively in accordance with the QoS, effective transmission of traffic can be performed while satisfying various QoSs requested dependent upon various types of traffic.

Note that, a mode in which observed QoS information is received from the receiving side, in other words, the mobile terminal 3, is conceivably either a mode where the mobile terminal 3 is regularly making transmissions of the observed QoS information or a mode in which the mobile terminal 3 makes transmissions of it in accordance with transmission requests from the base station 2. In either case, the information comes from the mobile terminal 3, stored in a predetermined position within the packet.

FIG. 3 is a diagram showing a configuration of another embodiment of a QoS control device according to the present invention. The constitution components of a QoS control device 4a are the same as those of the QoS control device 4. Moreover, a wireless parameter definition method for an adaptive wireless parameter controller 47 of QoS control device 4a is fundamentally the same as that of the QoS control device 4. What are different from the QoS control device 4 of FIG. 2 are the order of encoding and the like for the packet to be transmitted. To be specific, in the case of real time traffic, a real time traffic data encoder 44a encodes the packet to be transmitted based on the encoding scheme sent from the adaptive wireless parameter controller 47. Next, a real time traffic transmission sequencing controller 43a stores the packet to be transmitted in a real time traffic transmission buffer 42a and at the same time based on the retransmission parameter that is sent from the adaptive wireless parameter controller 47, performs the retransmission control. Then a real time traffic data modulator 45a modulates the packet to be transmitted based on the modulation scheme sent from the adaptive wireless parameter controller 47. Also, in the case of non-real time traffic, a non-real time traffic data encoder 44b encodes the packet to be transmitted based on the encoding scheme sent from the adaptive wireless parameter controller 47. Next, a non-real time traffic transmission sequencing controller 43b stores the packet to be transmitted in a non-real time traffic transmission buffer 42b and at the same time based on the retransmission parameter that is sent from the adaptive wireless parameter controller 47, performs the retransmission control. Then a non-real time traffic data modulator 45b modulates the packet to be transmitted based on the modulation scheme sent from the adaptive wireless parameter controller 47.

FIG. 4 is a diagram showing a detailed configuration of the adaptive wireless parameter controller 47 in the QoS control device 4 and the QoS control device 4a. In the diagram thereabove, the adaptive wireless parameter controller 47 is constituted by a retransmission parameter controller 471, an encoding scheme controller 472, a modulation scheme controller 473 and a wireless parameter set assignment definition 474. Here, in the wireless parameter set assignment definition 474, a definition is stored as a database as to which parameter set is assigned in accordance with the requested QoS information, the observed QoS information and the transmission path information.

Next, the operation of the adaptive wireless parameter controller 47 will be described. As mentioned previously, the requested QoS information, the observed QoS information and the transmission path information are inputted in the adaptive wireless parameter controller 47. The inputted requested QoS information, observed QoS information and transmission path information are inputted in all of the retransmission parameter controller 471, the encoding scheme controller 472 and the modulation scheme controller 473.

The retransmission parameter controller 471 defines the retransmission parameters in accordance with the requested QoS information, the observed QoS information and the transmission path information while making reference to the wireless parameter set assignment definition 474. Here, the retransmission parameters as previously mentioned include the retransmission algorithm (ARQ scheme) and the maximum retransmission number. However, having only one of these is also not a problem. Additionally, in this embodiment the aforementioned two have been assumed but information other than these for the retransmission parameter is also conceivable.

The encoding scheme controller 472 defines an encoding scheme in accordance with the requested QoS information, the observed QoS information and the transmission path information while making reference to the wireless parameter set assignment definition 474. Here, the encoding scheme as previously mentioned includes the forward error correction method and the encoding factor. However, having only one of these is also not a problem. Also, in this embodiment, the aforementioned two have been assumed but information other than these for the encoding scheme is also conceivable.

The modulation scheme controller 473 defines a modulation scheme for the requested QoS information, observed QoS information and the transmission path information while making reference to the wireless parameter set assignment definition 474. Here, as the modulation scheme, specifically, BPSK, QPSK, 8 PSK, 16 QAM, and 64 QAM are assumed but the modulation scheme is not limited to only these.

The retransmission parameters defined by the retransmission parameter controller 471, the encoding scheme defined by the encoding scheme controller 472 and the modulation scheme defined by the modulation scheme controller 473 are sent as previously mentioned respectively to the transmission sequencing controller 43, the data encoder 44 and the data modulator 45.

FIG. 5 is a flowchart to explain the processing of the adaptive wireless parameter control method of one embodiment according to the present invention. With reference to FIGS. 2 to 4 simultaneously, description will be made of the processing.

The QoS information identification unit 41 shown in FIG. 2, based on the QoS information of the packet to be transmitted, determines whether the packet is delayable or not and defines a QoS class (Step S1).

When requested QoS information that a packet is delayable is sent to the adaptive wireless parameter controller 47 as a result of the determination made by the QoS information identification unit 41, a retransmission number upper limit is set to a large value, in comparison with a packet which is not delayable, for example M0 (Step S2). The retransmission number upper limit being set by the retransmission parameter controller 471 in the adaptive wireless parameter controller 47 based upon a retransmission number upper limit assignment definition 474a included in the wireless parameter set assignment definition 474. When the packet is delayable, the encoding scheme controller 472 and the modulation scheme controller 473 respectively select an encoding scheme and a modulation scheme in accordance with the retransmission number upper limit M0 defined by the retransmission parameter controller 471 (Step S3).

On the other hand, When requested QoS information that a packet is not delayable is sent to the adaptive wireless parameter controller 47 as a result of the determination made by the QoS information identification unit 41, a retransmission number upper limit is set with a small value, in comparison with a packet which is delayable, for example M1 (Step S4). The retransmission number upper limit being set by the retransmission parameter controller 471 in the adaptive wireless parameter controller 47 based upon the retransmission number upper limit assignment definition 474a included in the wireless parameter set assignment definition 474. Also, when the packet is not delayable, the encoding scheme controller 472 sets the encoding scheme to, for example C1 (Step S5). The encoding scheme being based upon an encoding scheme assignment definition 474b within a wireless parameter set assignment definition 474, which reflects the retransmission number upper limit M1 defined by the retransmission parameter controller 471 and the observed QoS information. More concretely, in the case that the packet is not delayable, an encoding method and an encoding factor with higher error tolerance are selected. Furthermore, in the case that the packet is not delayable, the modulation scheme controller 473 sets the modulation scheme to, for example, Q1 (Step S6). The modulation scheme is based upon a modulation scheme assignment definition 474c within the wireless parameter set assignment definition 474, which reflects the encoding scheme C1 defined by the encoding scheme controller 472 and the transmission path information. In this manner, in the case that a packet is not delayable, wireless parameters M1, C1 and Q1 are defined (Step S7).

Note that, in the above description, the base station 2 is assumed as a transmission side, the base station 2 having a configuration with the QoS control device 4 equipped thereon, however, the configuration is not limited to this case, and the configuration may be applied to a case where the mobile terminal 3 is the transmission side. In that case, the mobile terminal 3 would have the QoS control device 4 of the present invention.

As described above, in consideration that the requested QoS varies according to each type of traffic, by means of the adaptive wireless parameter control method, the QoS control device and the wireless communication system according to the present invention, when transmitting a packet, since different wireless parameters are adaptively assigned for each type of traffic in accordance with the requested QoS, effective communication quality controls are realized in relation to the diverse QoS requests in multimedia communication.

It should be understood that many modifications and adaptations of the invention will become apparent to those skilled in the art and it is intended to encompass such obvious modifications and changes in the scope of the claims appended hereto.

What is claimed is:

1. An adaptive wireless parameter control method, for assigning a wireless parameter set including a maximum number of times for retransmission, a forward error correction scheme and a modulation scheme, for each packet to be transmitted including a different requested QoS information in accordance with the requested QoS information in mobile packet communication, comprising:

determining whether or not the packet to be transmitted is a delayable packet;

assigning, with a controller, a first maximum number of times for retransmission, a forward error correction scheme corresponding to the first maximum number of times for retransmission and a modulation scheme corresponding to the first maximum number of times for retransmission, for the packet to be transmitted, when the packet to be transmitted is determined to be a delayable packet; and assigning, with the controller, a second maximum number of times for retransmission which is smaller than the first maximum number of times for retransmission, a forward error correction scheme determined based on the second maximum number of times for retransmission and an observed QoS in an actual transmission and a modulation scheme determined based on the second maximum number of times for retransmission and the observed QoS in the actual transmission, when the packet to be transmitted is determined not to be a delayable packet.

2. The method of claim 1, wherein the controller is an adaptive wireless parameter controller of a base station.

3. A QoS control device comprising:

an adaptive wireless parameter controller for assigning a wireless parameter set including a maximum number of times for retransmission, a forward error correction scheme and a modulation scheme, for each packet to be transmitted including a different requested QoS information in accordance with the requested QoS information in mobile packet communication;

a QoS information identification unit for determining whether or not the packet to be transmitted is a delayable packet, wherein the adaptive wireless parameter controller has a retransmission parameter controller which adjustably assigns the maximum number of times for retransmission, an encoding scheme controller which adjustably assigns the forward error correction scheme, and a modulation scheme controller which adjustably assigns the modulation scheme, in accordance with the requested QoS information, and wherein the retransmission parameter controller assigns a first maximum number of times for retransmission, the encoding scheme controller assigns a forward error correction scheme corresponding to the first maximum number of times for retransmission, the modulation scheme controller assigns the modulation scheme corresponding to the first maximum number of times for retransmission, for the packet to be transmitted, when the packet to be transmitted is determined to be a delayable packet, and wherein the retransmission parameter controller assigns a second maximum number of times for retransmission which is smaller than the first maximum number of times for retransmission, the encoding scheme controller assigns a forward error correction scheme determined based on the second maximum number of times for retransmission and an observed QoS in an actual transmission, and the modulation scheme controller assigns a modulation scheme determined based on the second maximum number of times for retransmission and the observed QoS in an actual transmission, when the packet to be transmitted is determined not to be a delayable packet.

4. A base station, for performing wireless communication with a mobile terminal, comprising:

an adaptive wireless parameter controller for assigning a wireless parameter set including a maximum number of times for retransmission, a forward error correction scheme and a modulation scheme, for each packet to be transmitted including a different requested QoS information in accordance with the requested QoS information in mobile packet communication;
a QoS information identification unit for determining whether or not the packet to be transmitted is a delayable packet,
wherein the adaptive wireless parameter controller has a retransmission parameter controller which adjustably assigns the maximum number of times for retransmission, an encoding scheme controller which adjustably assigns the forward error correction scheme, and a modulation scheme controller which adjustably assigns the modulation scheme, in accordance with the requested QoS information,
and wherein the retransmission parameter controller assigns a first maximum number of times for retransmission, the encoding scheme controller assigns a forward error correction scheme corresponding to the first maximum number of times for retransmission, the modulation scheme controller assigns the modulation scheme corresponding to the first maximum number of times for retransmission, for the packet to be transmitted, when the packet to be transmitted is determined to be a delayable packet,
and wherein the retransmission parameter controller assigns a second maximum number of times for retransmission which is smaller than the first maximum number of times for retransmission, the encoding scheme controller assigns a forward error correction scheme determined based on the second maximum number of times for retransmission and an observed QoS in an actual transmission, and the modulation scheme controller assigns a modulation scheme determined based on the second maximum number of times for retransmission and the observed QoS in an actual transmission, when the packet to be transmitted is determined not to be a delayable packet.

5. A wireless communication system comprising:
a base station; and
a mobile terminal for performing wireless communication with the base station,
wherein the base station includes an adaptive wireless parameter controller for assigning a wireless parameter set including a maximum number of times for retransmission, a forward error correction scheme and a modulation scheme, for each packet to be transmitted including a different requested QoS information in accordance with the requested QoS information when a packet communication is performed with the mobile terminal;
a QoS information identification unit for determining whether or not the packet to be transmitted is a delayable packet,
wherein the adaptive wireless parameter controller has a retransmission parameter controller which adjustably assigns the maximum number of times for retransmission, an encoding scheme controller which adjustably assigns the forward error correction scheme, and a modulation scheme controller which adjustably assigns the modulation scheme, in accordance with the requested QoS information,
and wherein the retransmission parameter controller assigns a first maximum number of times for retransmission, the encoding scheme controller assigns a forward error correction scheme corresponding to the first maximum number of times for retransmission, the modulation scheme controller assigns the modulation scheme corresponding to the first maximum number of times for retransmission, for the packet to be transmitted, when the packet to be transmitted is determined to be a delayable packet,
and wherein the retransmission parameter controller assigns a second maximum number of times for retransmission which is smaller than the first maximum number of times for retransmission, the encoding scheme controller assigns a forward error correction scheme determined based on the second maximum number of times for retransmission and an observed QoS in an actual transmission, and the modulation scheme controller assigns a modulation scheme determined based on the second maximum number of times for retransmission and the observed QoS in an actual transmission, when the packet to be transmitted is determined not to be a delayable packet.

* * * * *